Aug. 12, 1958   E. T. LESSIG   2,846,752
METHOD OF REDUCING ELONGATION OF CORDS
Filed March 16, 1956
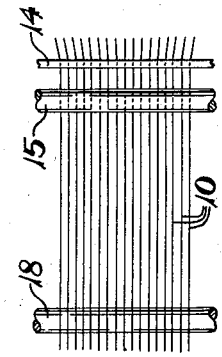
Fig. 2
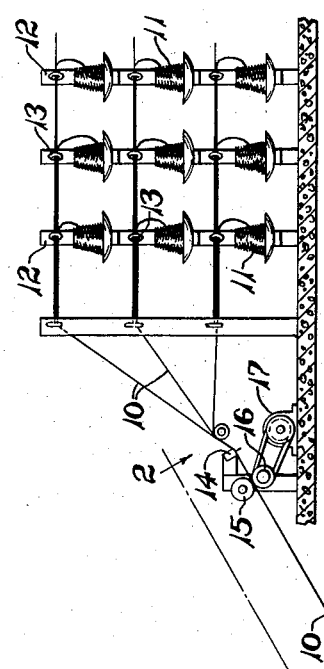
Fig. 1
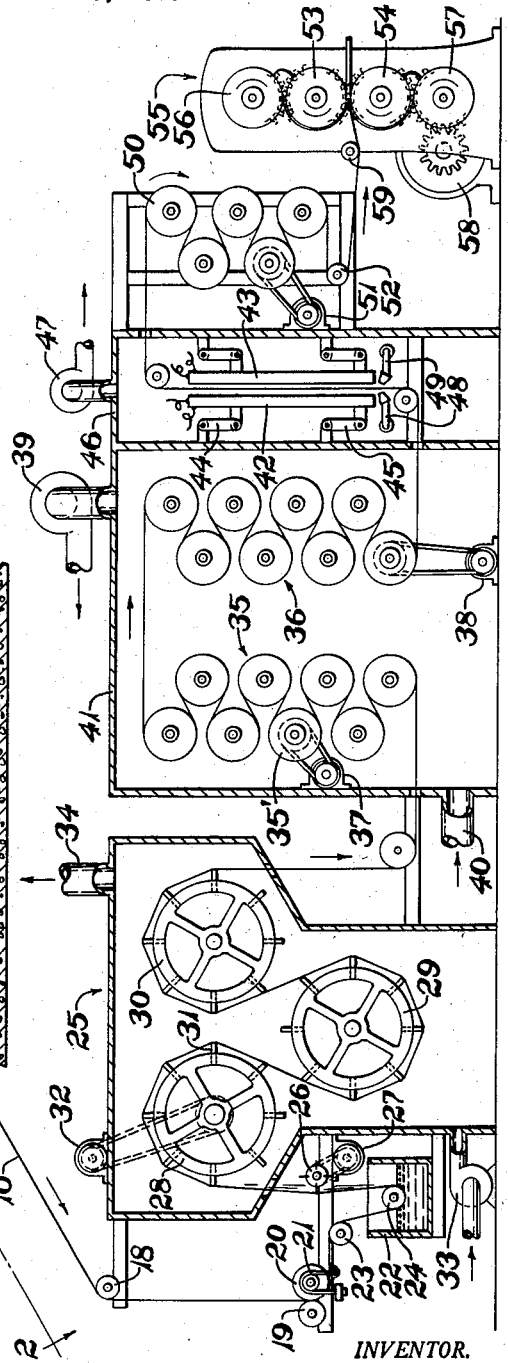
INVENTOR.
EDWARD T. LESSIG
BY
W. A. Shira, Jr.
ATTY.

United States Patent Office 2,846,752
Patented Aug. 12, 1958

2,846,752

METHOD OF REDUCING ELONGATION OF CORDS

Edward T. Lessig, Cuyahoga Falls, Ohio, assignor to The B. F. Goodrich Company, New York, N. Y., a corporation of New York Application March 16, 1956, Serial No. 571,921

16 Claims. (Cl. 28—72)

This invention relates to reduction of elongation of cords and, more particularly, to an improved method for reducing the elongation of cords intended for use as reinforcements in elastomeric material while the cords are being prepared for that use.

Cords employed as reinforcements in elastomers are frequently formed of a plurality of filaments twisted together, the twisting being provided to increase flex strength or other desirable characteristics. Such cords, especially those formed of thermoplastic filaments, as for example, the linear polyamides commonly known as nylon, tend to elongate or "grow" when placed under tension and subjected to heat. This characteristic is undesirable in many articles since it results in change of dimensions of the article that, in turn, may cause cracking, ply separation or other defects. For example, inflatable tires formed of rubber reinforced by twisted nylon cords have been known to increase in transverse dimensions or grow to such an extent as to cause objectionable cracks in the tread and sidewalls. Although it is known that such cord elongation can be reduced to a satisfactory extent by heating the cord to an elevated temperature, stretching the heated cord, and then cooling it while maintaining the stretching tension, it has been difficult to perform these operations economically on a commercial scale. Thus, when the cord treated is formed of thermoplastic filaments, such as linear polyamides, the heating should be to a temperature in the neighborhood of the melting point of the fibers, and the cord can only be held at this temperature for a very short time before it begins to deteriorate rapidly in tensile strength and other properties. Hence, slight variations in the temperature of the source of heat, or a brief stop in movement of the cords, results in severe damage to a considerable quantity thereof. It therefore has been considered impractical to incorporate a treatment of this nature as a part of a continuous process in preparing the cord for use in elastomeric articles, which preparation includes moving the cords continuously from cones or packages thereof through apparatus for applying a cord-to-rubber adhesion promoting substances, drying, heating and stretching the cords and, finally, calendering an elastomeric material thereon.

An object of this invention is, therefore, to provide an improved method of reducing elongation of cords, which are to be used as reinforcement in elastomeric material, by heating the cords and stretching them as an uninterrupted sequel to the application of a cord-to-rubber adhesion promoted substance and drying of such substance, the heating and stretching being effected in a manner such that excessive elongation of the cords is eliminated without appreciable reduction of tensile strength and with less danger of deterioration of the cords than in processes heretofore employed.

A more specific object of the invention is to provide an improved method of reducing elongation of cords, formed from thermoplastic filaments, as a part of an uninterrupted preparation of the cords for use as reinforcements in elastomeric articles, the process including the application of a cord-to-rubber adhesion promoting substance to the cords while they are under tension and beginning the elongation removal by increasing the tension on the twisted cords and raising the temperature thereof while completing the drying of the cords, the elongation removal being completed by immediately thereafter raising the temperature of the cords to approximately the melting point of the cord material for a time interval less than that required to melt the cords and then reducing the temperature of the cords while maintaining the tension, after which the tension on the cords is reduced and an elastomeric material is coated thereon.

A still more specific object of the invention is to provide an improved method, as defined in the preceding paragraph, wherein the temperature of the cords during the initial drying operation does not exceed 212° F. after which the temperature of the cords and the tension thereon are increased to complete the drying and effect a part of the stretching, completion of elongation removal being effected at a temperature in the range of 400° to 450° F. to which the cords are subjected for a time interval in the range of 4 to 12 seconds while under a tension which is in the range of five to ten times the tension during application of the adhesion promoting substance.

An additional object of the invention is to provide an improved cord elongation reducing procedure as defined above, wherein the atmosphere adjacent the cords during the heating thereof is so controlled that deterioration of the cord through oxidation or attack by decomposition products is substantially eliminated.

Further objects and advantages of the invention will be apparent to those skilled in the art to which it pertains from the following description of the presently preferred embodiment thereof, described with reference to the accompanying drawing forming a part of this application and in which:

Fig. 1 is a schematic view principally in side elevation, but with parts broken away to more clearly show the arrangement of instrumentalities used in practicing the method of the invention; and Fig. 2 is a fragmentary plan view of the portion of Fig. 1 between the arrows 2—2 showing the parallel arrangement of the cords.

The invention will be described with specific reference to its use in preparing cords for incorporation into rubber articles, such as tires, by forming a plurality of the cords into an elastomeric coated web of weftless fabric with the individual cords disposed in parallel relationship and retained therein solely by the rubber or other elastomeric material calendered thereon. As indicated in Fig. 1 of the drawings, the cords 10 for preparing a weftless fabric of this nature are supplied from a plurality of cones or packages 11 which are supported in a suitable framework 12, the cords being led from the several cones through guides 13 upon the framework which direct the cords into a generally parallel arrangement as is shown in Fig. 2. The spacing of the cords and their disposal in a substantially planar, parallel relationship is achieved and facilitated by conventional means including a suitable comb 14 or the like. The impetus for withdrawing the cords from the several cones 11 and moving the cords longitudinally of their lengths into the aforementioned parallel relationship is provided by suitable rolls, such as rolls 15 and 16 which may be driven by an electric motor 17 or other suitable power means.

Due to the size of the installation, the creel is indicated as being located upon a different elevation from that of the subsequent cord treating apparatus and the cord is conducted from the driving roll 16 over suitable direction changing rolls, such as 18, to a pair of snubbing rolls 19 and 20 at least one of which, for example, roll 20, is provided with a brake 21 to retard rotation of the rolls for a purpose hereinafter described. From the rolls 19 and 20 the cords 10 are led through a means for applying a cord-to-rubber adhesion promoting substance which is in liquid form and is here shown as contained in a tank 22 through which the cords 10 are led by suitable rolls such as 23 and 24. After passing through the liquid containing tank 22, the cords are led into a drying chamber 25 but, prior to their entrance into this chamber, excess liquid is removed from the cords without causing increased penetration of the liquid by vibrating the cords laterally of their direction of travel. This vibration of the cords is achieved by a rotary beater 26 driven by a motor 27.

The drying chamber 25 contains a plurality of vane-type drying reels, three of which 28, 29 and 30, are shown. These reels are identical and each comprises a plurality of radially extending vanes or bars 31 which extend axially of the reels and support the cords 10 at spaced locations. At least one of the reels, such as 28 is driven by suitable means, for example, an electric motor 32, at a speed such that a tension of low order is imposed upon the cords between the reel 28 and the snubbing rolls 19 and 20, the extent of this tension being regulated both by adjustment of the driving speed of the motor 32 and by the force of the braking means 21. Within the chamber 25, the cords are subjected to heated gas, preferably air, which is forced through the chamber by suitable means, such as a blower 33, located adjacent the lower portion of the housing, the gas being exhausted through the top of the housing as indicated by the conduit 34. The moisture content of the cords is reduced by the heated gas in the housing 25 to an amount such that the adhesion promoting substance on the cords does not adhere to surfaces with which the cords thereafter come in contact, this drying action being facilitated by the fact that the reels 28, 29 and 30 permit free circulation of the air or other gas through and around the cords.

From the chamber 25 the partially dried cords are led over a plurality of drying cans or rolls 35 and 36, here shown as arranged in two vertically staggered arrangements. The cans or rolls 35 and 36 are of conventional construction and are in the nature of hollow drums to which steam may be admitted and exhausted to effect heating. The tensioned cords 10 pass in contact with the surfaces of these cans and are heated thereby so that they are stretched a small amount. Movement of the cords 10 from the reel 28 over the reels 29 and 30, and over the lower of the cans or rolls 35, is effected by driving one of the cans such as 35' by suitable means such as the electric motor 37. Movement of the cords over the remaining cans or rolls 35 and 36 is achieved by driving the last of the cans or rolls 36 by a suitable power means such as motor 38. The speeds of the motors 37 and 38 are so related to each other and to the speed of motor 32 that the tension on the cords is increased as it passes over the heated cans or rolls 35 and 36.

Preferably, the heating cans or rolls 35 and 36 are suitably enclosed in a housing and a means, such as a blower 39, is provided for withdrawing the heated vapors, fumes or the like resulting from passage of the cords over the heated surfaces. A fresh-air intake may be provided, as indicated at 40, adjacent the lower portion of the housing 41 and, if desired, means may be provided to admit inert gas in place of air, should this be considered desirable to further reduce the possibility of cord deterioration by virtue of breakdown or decomposition of the adhesion promoting substance during the cord heating and stretching operation.

After leaving the last of the heated cans or rolls 36, the cords 10 are next subjected to a high heat and increased tension to effect the major portion of the stretching operation. This is achieved by conducting the cords past a source of radiant heat. As here shown, the radiant heat is supplied by opposed platens 42 and 43 which are intended to be electrically heated and which are disposed closely adjacent the cords in a vertical arrangement so that the atmosphere surrounding the cords in the region of high heat is of relatively small volume and the platens provide a chimney effect to facilitate removal of the atmosphere surrounding the cords. The platens 42 and 43 are mounted upon suitable linkages, such as 44 and 45, which may be connected to means, not shown, for moving the platens from the positions indicated wherein they are closely adjacent the cords, to positions spaced therefrom to thus prevent injury to the cords in the event of stoppage or slowing of movement of the cords therepast. Preferably, the platens or other source of radiant heat are located in a closed chamber 46 from which the fumes resulting from heating of the cords may be removed by a suitable means such as a blower 47. In order to further prevent injury to the cords by decomposition products formed from chemical breakdown of the adhesion promoting substance during the heating of the cords, means are provided to introduce an inert atmosphere into the space between the platens through which the cords move. Such means is schematically indicated in the drawing by the pipes or conduits 48 and 49 adjacent the lower portion of the platens 42 and 43.

After passing between the heated platens 42 and 43, the cords 10 are led from the chamber or housing 46 in which the platens are located and over a plurality of snubbing rolls 50, at least one of which is driven by a suitable means, such as a motor 51. The snubbing rolls 50 may be hollow to permit the introduction of temperature conditioning fluid if this should be considered necessary or desirable. The speed of rotation of the motor 51 is so controlled relative to the speed of rotation of the motor 38 that the tension on the cords 10 is increased between the last of the heating and drying cans or rolls 36 and the snubbing rolls 50 with the result that the cords 10 are stretched as they are subjected to the high heat provided by the platens.

After leaving the snubbing rolls 50, the cords pass over one or more suitable direction changing rolls such as 52, and are then conducted between the rolls 53 and 54 of a calender 55 which applies an elastomeric material such as natural or synthetic rubber to the opposite sides of the cords 10, in a well known manner, from banks of the material maintained and supplied over the rolls 53 and 54 by means of the rolls 56 and 57. The rolls of the calender may be driven by suitable intermeshing gears and a prime mover, such as motor 58, as is well known in the art. The speed of the calender rolls 54 and 53 is so related to the speed of the motor 51 that the tension upon the cords 10 is less than that to which the cords were subjected as they moved between the heated platens. The tension provided by the calender is sufficient, however, so that the cords are held in their proper spaced relationship this being facilitated by a grooved roller or thread bar 59 over which the cords move just prior to passing between the calender rolls 53 and 54. The coated cords leaving the calender will be in the form of a self-sustaining web or sheet which may be moved through other treating and handling equipment for incorporating the material into elastomeric articles, or the web or sheet of coated cords may be wound up upon suitable rolls for subsequent use as may be desired.

In practicing the method of this invention, the cords 10, which preferably are thermoplastic in nature, such as nylon, Dacron and the like, are removed from the creel under a tension of low order that may conveniently be in the order of 15 to 30 grams per cord where the cords are of a size corresponding to an 840/2 nylon cord having a diameter of approximately 0.02 inch. The tension on the cords is increased before they enter the adhesive applying means so that the cords are dipped or treated with the adhesive in the tank 22 while under a tension in the range of ⅓ to ⅔ pound per cord and while at substantially room temperature so that the cords may be stretched in the neighborhood of 1% to 2%. After passing from the adhesive applying tank 22, the cords are conducted through the drying chamber 25 under substantially the same tension as that to which they were subjected during the dipping or other adhesive applying operation and at this time the temperature of the cords is raised to approximately the boiling point of the liquid in the adhesive coating substance which temperature is in the neighborhood of 212° F. This may be achieved by circulating heated air or other gas through the chamber 25 at a temperature in the order of 325° F. The extent of treatment in the chamber 25 should be such that the moisture content of the cords is reduced to a point such that the adhesive on the cords is not sufficiently tacky to adhere to the surfaces of the cans or rolls 35 and 36. This moisture content should not ordinarily exceed 10% but may be as low as 2%.

The cans or rolls 35 and 36 are supplied with steam under pressure to raise the temperature of the cords so that at the time of issuing from the chamber 41 the cords will be at a temperature in the neighborhood of 300° F. For this purpose it has been found that steam supplied to the cans or drums 35, 36 should be under pressure that may be as high as 200 p. s. i. The tension on the cords during this treatment would ordinarily be in the range of ¾ to 1½ pounds per cord, although the cord tension may be slightly higher adjacent the last of the cans or rolls 36 and satisfactory results are achieved when this tension is as high as two pounds per cord.

After the cords have been partially stretched and their temperatures raised in the chamber 41, they are next heated to a temperature approximating the melting point of the material from which the cords are made for a very short interval of time while the cords are under increased tension. The temperature to which the cords are actually subjected must of course, be correlated to the time during which the cords are thus treated so that the cords do not actually melt. Experiments have shown that satisfactory results are achieved with nylon cord when the temperatures are in the range of 400 to 450° F. for treatment times of 4 to 12 seconds and with the cords under a tension of from 3 to 5 pounds per cord with the tension occasionally being increased to as high as 6 pounds per cord without deleterious effects.

As the cords emerge from the region of high temperature provided by the platens 42 and 43 they are rapidly cooled while maintained under the tension to which they were subjected during passage between the platens so that the temperature of the cords is dropped below 250° F. and in some instances below 150° F. This rapid drop of cord temperature can be effected by simply permitting the cords to air cool as they move about the snubbing drums 50 but means may be provided to increase the rate of cooling if desired. After the cords have been cooled, the tension thereon is reduced to an amount suitable for further processing. For calendering elastomeric material on the cords the tension may be reduced to a value in the order of 1 to 2 pounds per cord. The temperature of the cords at this time as well as the tension should also be such as to facilitate ready reception of the elastomeric material. Hence, if the temperature of the cords after leaving the snubbing rolls 50 is too low for satisfactory calendering, suitable heating means for the cords may be provided adjacent their entrance between the calendar rolls.

The following is a specific example of the temperatures and tensions employed in practicing the method of this invention. Nylon cord of 840/2 construction, having a diameter in the order of 0.02 inch, is provided in the form of a plurality of cones in a creel from which the cords are withdrawn and moved into parallel relationship under a tension in the order of 15 to 30 grams per cord. These cords, unattached to each other, are moved through the treating processes as a weftless web in the aforementioned parallel relationship and while thus moving were provided with a coating of resorcinol formaldehyde latex composition as a liquid-to-rubber adhesive. This composition is applied to the cords while they move under a tension of approximately 200 grams per cord, the composition contained 10% to 20% solids with the liquid portion thereof being water. Excess liquid is removed from the cords by vibrating them laterally of their path of movement through contact therewith of a rotatable beater so that the excess liquid is removed from the surface of the cords and not forced more deeply therein as would be the case had squeeze rolls or similar expedients been utilized. These cords are then moved through the drying chamber 25 where their moisture content is reduced to in the order of 2% without allowing the temperature of the cords to rise above 212° F. The cords are then further dried, heated and tensioned by passage over steam heated cans, the temperature of the cords as they issue therefrom being in the neighborhood of 300° F. and the tension thereon in the order of two pounds. Thereafter the cords move through a region of radiant heat and are subject to temperatures approximating the melting point of the cords for a short interval of time, which temperatures are in the neighborhood of 430° F., for a time interval of 6 seconds while under a tension in the order of 5 pounds per cord. The cords are then cooled while still under this increased tension to a temperature of approximately 150° F. and are calendered with rubber. Such cords when employed as a ply fabric in inflatable tires will evidence reduced elongation and less tendency to grow than cords which had not been so treated. Moreover, the cords will possess higher tensile strengths than cords prepared by other known methods of hot stretching.

Although the invention has been described specifically with reference to its use in hot stretching nylon cord, it will be appreciated that the process may be employed with cords of other thermoplastic materials, such as those known as Dacron, Perlon, and similar substances, by suitable selection of the temperatures, tensions and length of time of stretching for the several steps of the process which can be readily determined from comparison of the known characteristics of the materials with those of nylon. That is to say, since the melting points of these materials are somewhat different from that of nylon, the temperature of the radiant heat treatment and the speed of cord movement should be appropriately selected so that melting does not occur. It will also be appreciated that although the cord-to-rubber adhesive specifically mentioned is resorcinol formaldehyde latex composition, many other known adhesion promoting substances can be employed and the invention is not limited to use with any specific adhesion promoting substance. In short, the invention does not reside in the details of the equipment employed for the treatment, the composition with which the cords are coated, or the specific size, material of composition, or other characteristics of the cords other than that the cords should be such as to have a tendency to grow when heated, which tendency can be reduced by raising the cords to a temperature in the order of 400° F., stretching the cords while thus heating and then cooling before reducing the stretching.

The essence of the invention is considered to reside in the combination of treatment steps as a single continuous process wherein: the cords are placed under tension of low order; provided with the cord-to-rubber adhesion while under this low tension; thereafter partially dried without exceeding a temperature of 212° F.; then preliminarily stretched, heated and the drying completed by increasing the tension on the cord and the temperature thereof; after which the heating and stretching are completed at a temperature less than the melting point of the cord material for a time interval of less than that required to melt the cords and at tensions in the order of 5 to 10 times the tension applied to the cords, during the application of the adhesion promoting substance; the heated and stretched cords being cooled while under tension after which the tension is relaxed sufficiently to facilitate its incorporation into an elastomeric coating. The invention is therefore to be considered as inclusive of variations coming within the spirit and scope of the appended claims.

Having thus described the invention, I claim:

1. The method of reducing the elongation of cords formed of thermoplastic filaments while preparing the cords for use as reinforcements in elastomeric articles comprising tensioning said cords, applying to the tensioned cords a liquid cord-to-rubber adhesion promoting substance, removing excess liquid from the surfaces of the cords by vibrating the latter, drying said cords to an amount such that said adhesion promoting substance does not transfer from the cords to surfaces which the cords contact, increasing the tension on said cords to an amount at least several times the tension during the application of the liquid, heating the cords while under said increased tension to a temperature in the order of the melting point of the cords for a time interval less than that sufficient to melt the cords, and reducing the temperature of the cords to a temperature well below the melting point of the cords while the latter are still under said increased tension.

2. The method of reducing the elongation of cords formed of thermoplastic filaments while preparing the cords for use as reinforcements in elastomeric articles comprising tensioning said cords, applying to the tensioned cords a liquid cord-to-rubber adhesion promoting substance, removing excess liquid from the surfaces of the cords, drying said tensioned cords to an amount such that said adhesion promoting substance does not transfer from the cords to surfaces which the cords contact, increasing the tension on said cords to an amount in the range of 5 to 10 times the tension during the application of said liquid, heating the cords to a temperature in the order of 400° F. to 450° F. for a time interval of 4 to 12 seconds while maintaining the increased tension on the cords, and then reducing the temperature of the cords to a value in the order of 150° F. while maintaining the said increased tension on the cords.

3. The method of reducing elongation of cords formed of thermoplastic filaments while preparing the cords for use as reinforcements in elastomeric articles comprising tensioning said cords, applying to said tensioned cords a liquid cord-to-rubber adhesion promoting substance, removing excess liquid from the surfaces of the cords, drying said cords to an amount such that said adhesion promoting substance does not transfer from the cords to surfaces which the cords contact, increasing the tension on said cords to an amount at least several times the tension during the application of said liquid and raising the temperature of the cords to a value in the range of 212° F. to 300° F., further increasing the tension on said cords and raising the temperature thereof above 300° F. for a time interval of a fraction of a minute, and reducing the temperature of the cords to a value less than 250° F. while the cords are still under said increased tension.

4. The method as defined in claim 3 wherein an atmosphere of inert gas is provided about said cords at least during the said heating thereof to a temperature above 300° F.

5. The method of reducing elongation of cords formed of thermoplastic filaments while preparing the cords for use as reinforcements in elastomeric articles comprising disposing a plurality of the cords in closely adjacent parallel relationship, tensioning said cords, applying to said tensioned cords a liquid cord-to-rubber adhesion promoting substance, removing excess liquid from the surfaces of the cords without increasing the penetration of the liquid into the cords, drying said cords to an amount such that said adhesion promoting substance does not transfer from the cords to surfaces which the cords contact, increasing the tension on said cords and increasing the temperature thereof above 212° F. and well below the melting point of the cords, further increasing the tension on said cords to a value in the range of 5 to 10 times the tension during the application of said liquid, further heating said cords to a temperature approximating the melting point of the cords for a time interval less than that sufficient to melt the cords while maintaining the said further increased tension on the cords, rapidly reducing the temperature of the cords to a temperature well below the melting point of the cords while the latter are still under the said further increased tension, and then reducing said tension and calendering elastomeric material on the cords.

6. The method of reducing elongation of cords formed from twisted filaments while preparing the cords for use as reinforcements in elastomeric articles comprising tensioning said cords, applying to said tensioned cords a liquid cord-to-rubber adhesion promoting substance, removing excess liquid from the surfaces of the cords without increasing the penetration of the liquid into the cords, partially drying said cords to an amount such that said adhesion promoting substance does not transfer from the cords to surfaces which the cords contact by heating the cords to a temperature not substantially over 212° F., increasing the tension on said cords to an amount in the range of 5 to 10 times the tension during the application of said liquid, raising the temperature of the cords to a temperature in the range of 400° to 450° F., for a time interval of 4 to 12 seconds while maintaining the said increased tension on the cords, reducing the temperature of the cords to a temperature less than 250° F., while the cords are still under the said increased tension, and reducing the tension on the cooled cords.

7. The method as defined in claim 6 wherein the said heating of the cords to a temperature in the order of 400° to 450° F., is effected by radiation from surfaces closely adjacent to the cords and an atmosphere of inert gas is maintained around the cords during the said radiation.

8. The method of preparing cords formed of thermoplastic filaments for use as reinforcements in elastomeric articles comprising disposing a plurality of the cords in closely adjacent parallel relationship, tensioning said cords, applying to said tensioned cords a liquid cord-to-rubber adhesion promoting substance, removing excess liquid from the surfaces of the cords without increasing the penetration of the liquid into the cords, drying said tensioned cords to a moisture content of 2% to 10% by heating them to a temperature approximately 212° F., increasing the tension on said cords, completing the drying of the cords while under said increased tension by raising the temperature of the cords to over 212° F. but well below the melting point of the cords, further increasing the tension on said cords and heating said cords to a temperature approximating the melting point of the cords for a time interval less than that sufficient to melt the cords while maintaining the said increased tension, reducing the temperature of the cords to a temperature well below the melting point of the cords while the latter are still under the said increased tension, and then reducing said tension and calendering elastomeric material on the cords.

9. The method of preparing cords formed of linear polyamide filaments for use as reinforcements in elastomeric articles comprising disposing a plurality of the cords in closely adjacent parallel relationship, tensioning said cords to an amount in the range of ⅓ to ⅔ pound per cord, applying to said tensioned cords a liquid cord-to-rubber adhesion promoting substance while maintaining the tension on the cords, vibrating the cords to remove excess liquid from the surfaces thereof without increasing the penetration of the liquid into the cords, drying said cords to an amount such that said adhesion promoting substance does not transfer from the cords to surfaces which the cords contact, increasing the tension on said cords to an amount in the range of ¾ to 2 pounds per cord, completing the drying of the cords while under said increased tension by raising the temperature of the cords to over 212° F., further heating said cords to a temperature in the range of 400 to 450° F. for a time interval of 4 to 12 seconds and further increasing the tension on the cords to not over 6 pounds per cord, rapidly reducing the temperature of the cords to below 250° F., while the cords are still under said further increased tension, and thereafter reducing the tension on said cords.

10. The method of preparing cords formed of linear polyamide filaments for use as reinforcements in elastomeric articles comprising disposing a plurality of the cords in closely adjacent parallel relationship, moving said cords in the direction of their lengths while maintaining the cords in said closely adjacent parallel relationship, tensioning said moving cords to an amount in the order of ½ pound per cord, applying to said moving tensioned cords a liquid cord-to-rubber adhesion promoting substance while maintaining the tension on the cords, removing excess liquid from the surfaces of the cords without increasing the penetration of the liquid into the cords, drying said cords while moving to a moisture content of 2% to 10%, increasing the tension on said moving cords to an amount in the range of ¾ to 2 pounds per cord, and raising the temperature of the cords to over 212° F. but well below the melting point of the cords, further heating said cords to a temperature in the range of 400 to 450° F. for a time interval of 4 to 12 seconds while moving the cords and further increasing the tension on the cords to an amount in the range of 3 to 5 pounds per cord, thereafter rapidly reducing the temperature of the cords to a value below 250° F. while the cords are still moving under said further increased tension, and then reducing the tension on the cords and calendering elastomeric material thereon.

11. The method of preparing cords formed of linear polyamide filaments for use as reinforcements in elastomeric articles comprising disposing a plurality of the cords in closely adjacent parallel relationship, moving said cords in the direction of their lengths under a tension in the order of ⅓ to ⅔ pound per cord, applying to said moving tensioned cords a liquid cord-to-rubber adhesion promoting substance while maintaining the tension on the cords, laterally vibrating the moving cords to remove excess liquid from the surfaces thereof without increasing the penetration of the liquid into the cords, passing heated air over said moving cords to dry the cords to an amount such that said adhesion promoting substance does not transfer from the cords to surfaces which the cords contact, increasing the tension on said moving cords and raising the temperature of the cords while under said increased tension by moving them over heated surfaces while removing the resulting vapors from the vicinity of the cords, the temperature of the surfaces and rate of movement of the cords being such that the temperature of the cords is above 212° F. but well below the melting point of the cords, increasing the temperature of said moving cords to a value in the range of 400° to 450° F. for a time interval of 4 to 12 seconds and further increasing the tension on the cords, rapidly reducing the temperature of the cords to a value of below 250° F. while the cords are still under said increased tension, and then reducing the tension on the cooled cords and calendering elastomeric material on the cords.

12. A continuous method of preparing cords formed of thermoplastic filaments for use as reinforcements in elastomeric articles comprising tensioning said cords to an amount in the order of ½ pound per cord, applying a liquid cord-to-rubber adhesion promoting substance while maintaining the tension on the cords, vibrating the cords after said liquid application to remove excess liquid from the surfaces of the cords without increasing the penetration of the liquid into the cords, partially drying said cords by subjecting them to an atmosphere of heated gas for a time interval and at a temperature such that the temperature of the cords does not rise substantially above 212° F. and the adhesion promoting substances is sufficiently set to prevent transfer of it from the cords to surfaces which the cords contact, increasing the tension on said cords after said partial drying to an amount in the range of ¾ to 2 pounds per cord and contacting them with heated surfaces such that the temperature of the cords is raised above 212° F., thereafter subjecting the said cords to radiant heat sufficient to raise the temperature of the cords approximately to their melting point for a time interval less than that sufficient to melt the cords while further increasing the tension thereon to an amount in the range of 3 to 6 pounds per cord, reducing the temperature of the cords to a temperature well below the melting point of the cords while the latter are still under said further increased tension, and then reducing the tension on the cooled cords before introducing them into the elastomeric material.

13. The method as defined in claim 12 wherein said cords are surrounded by an atmosphere of an inert gas during the time they are subjected to said radiant heat.

14. The method as defined in claim 12 wherein said radiant heat is applied to said cords by closely spaced parallel surfaces between which an inert gas is flowed.

15. A continuous method of preparing cords formed of linear polyamide filaments for use as reinforcements in elastomeric articles comprising disposing a plurality of the cords in closely adjacent parallel relationship and moving the cords in the direction of their lengths while in said relationship, tensioning said moving cords to an amount in the order of ½ pound per cord, passing said tensioned cord through a liquid cord-to-rubber adhesion promoting substance while maintaining the tension on the cords, laterally vibrating the cords as they move from said liquid to remove excess liquid from the surfaces of the cords without increasing the penetration of the liquid into the cords, subjecting the moving cords to heated air until the moisture content of the cords has been reduced to 2% to 10%, increasing the tension on said moving cords after said partial drying to an amount in the range of ¾ to 2 pounds per cord, completing the drying of the cords to a moisture content of less than 2% while the cords are under said increased tension by passing them over heated surfaces such that the temperature of the cords exceeds 212° F. but is well below the melting point of the cords, removing the resulting vapors from the vicinity of the heated surfaces to prevent degradation of the cords, increasing the tension on the cords to an amount in the range of 3 to 5 pounds per cord and subjecting the said moving and further tensioned cords to radiant heat sufficient to raise the temperature of the cords approximately to their melting point for a time interval less than that sufficient to melt the cords while the cords are surrounded by an atmosphere of inert gas, further reducing the temperature of the cords to a temperature well below the melting point of the cords while the latter are still moving under said further increased tension, and then reducing the tension on said cords and calendering elastomeric material thereon.

16. A continuous method of preparing cords formed of linear polyamide filaments for use as reinforcements in elastomeric articles comprising disposing a plurality of the cords in closely adjacent parallel relationship and moving the cords in the direction of their lengths while in said relationship, tensioning said moving cords to an amount in the order of ⅓ to ⅔ pound per cord, passing said tensioned cords through a liquid cord-to-rubber adhesion promoting substance while maintaining the tension on the cords, laterally vibrating the cords as they move from said liquid to remove excess liquid from the surfaces of the cords, passing the cords through a zone of heated air until the moisture content of the cords has been reduced to 2% to 10%, increasing the tension on said moving cords after said partial drying to an amount in the range of ¾ to 2 pounds per cord, completing the drying of the cords to a moisture content of less than 2% while the cords are under said increased tension by passing them over heated surfaces such that the temperature of the cords exceeds 212° F., removing the resulting vapors from the vicinity of the heated surfaces to prevent degradation of the cords, thereafter increasing the tension of the cords to over 3 pounds per cord and passing them closely adjacent a source of radiant heat such that the temperature of the cords is raised to a value of 400° to 450° F. while moving therepast in a time interval of 4 to 12 seconds, reducing the temperature of the cords to a value of less than 250° F. while the cords are still under said increased tension, and then reducing the tension on said cords and calendering elastomeric material thereon.

References Cited in the file of this patent
UNITED STATES PATENTS

| | | |
|---|---|---|
| 2,220,958 | Jennings | Nov. 12, 1940 |
| 2,320,691 | Wright | June 1, 1943 |
| 2,349,290 | Loughborough | May 23, 1944 |
| 2,419,922 | Tippetts | Apr. 29, 1947 |
| 2,450,847 | Wilson | Oct. 5, 1948 |
| 2,590,586 | Thompson et al. | Mar. 25, 1952 |
| 2,627,103 | Jennings | Feb. 3, 1953 |
| 2,766,505 | Weiss | Oct. 16, 1956 |

UNITED STATES PATENT OFFICE
CERTIFICATE OF CORRECTION

Patent No. 2,846,752                                        August 12, 1958

Edward T. Lessig

It is hereby certified that error appears in the printed specification of the above numbered patent requiring correction and that the said Letters Patent should read as corrected below.

Column 7, line 65, before "increased" insert -- further --.

Signed and sealed this 11th day of November 1958.

(SEAL)
Attest:

KARL H. AXLINE                                          ROBERT C. WATSON
Attesting Officer                                       Commissioner of Patents